United States Patent [19]

Allaire et al.

[11] Patent Number: 5,110,652
[45] Date of Patent: May 5, 1992

[54] SHAPED FIBER-REINFORCED CERAMIC COMPOSITE ARTICLE

[75] Inventors: Roger A. Allaire, Big Flats; G. Daniel Lipp, Painted Post, both of N.Y.

[73] Assignee: Corning Incorporated, Corning, N.Y.

[21] Appl. No.: 445,398

[22] Filed: Dec. 4, 1989

[51] Int. Cl.⁵ .................... B32B 5/12; B32B 5/08; F01D 5/28

[52] U.S. Cl. ..................... 428/114; 428/113; 428/294; 428/297; 428/298; 428/367; 428/408; 428/428; 428/698; 428/902; 428/70; 428/76; 428/105; 428/107; 428/108; 428/109; 428/110; 428/156; 428/161; 428/172; 428/174; 65/18.1; 501/88; 501/89; 264/112; 264/113; 416/241 B

[58] Field of Search .............. 428/113, 114, 294, 297, 428/298, 367, 408, 428, 698, 902, 70, 76, 105, 107, 108, 109, 110, 156, 161, 172, 174; 65/18.1; 264/112, 113; 501/88, 89; 416/241 B

[56] References Cited

U.S. PATENT DOCUMENTS

| | | | |
|---|---|---|---|
| 3,649,425 | 3/1972 | Alexander | 428/76 X |
| 3,765,996 | 10/1973 | Munzon | 428/114 X |
| 4,314,852 | 2/1982 | Brennan et al. | 501/88 |
| 4,324,843 | 4/1982 | Brennan et al. | 428/112 X |
| 4,410,635 | 10/1983 | Brennan et al. | 501/88 |
| 4,412,854 | 11/1983 | Layden | 65/18.1 |
| 4,428,763 | 1/1984 | Layden | 65/4.21 |
| 4,464,192 | 8/1984 | Layden et al. | 65/18.1 |
| 4,464,475 | 8/1984 | Chyung et al. | 501/9 |
| 4,554,197 | 11/1985 | Chzung et al. | 428/113 |
| 4,615,987 | 10/1986 | Chyung et al. | 501/8 |
| 4,755,489 | 7/1988 | Chyung et al. | 501/8 |
| 4,909,872 | 3/1990 | Jarmon | 428/113 X |

FOREIGN PATENT DOCUMENTS 2228602 10/1987 Japan .............. 416/241 B

Primary Examiner—Ellis P. Robinson
Assistant Examiner—William P. Watkins, III
Attorney, Agent, or Firm—Kees van der Sterre

[57] ABSTRACT

A ceramic matrix composite article having a varying thickness is fabricated by a process wherein multiple prepreg sheets comprising reinforcing fibers and powdered matrix material are stacked to provide a multilayer prepreg stack wherein, through each cross-sectional dimension perpendicular to the plane of the sheets, the number of prepreg sheets contributing to the aggregate sheet thickness of the stack varies in proportion to the relative thickness desired in the layered article. The stack may consolidated to a composite article with a smoothly varying thickness profile without undue fiber breakage or ply wrinkling in the composite structure consolidated into a composite article having a smoothly varying thickness profile with reduced internal fiber bowing or breakage. Preferably, the exterior surfaces of the article comprise long, substantially continuous fibers and are free of ply drops.

3 Claims, 3 Drawing Sheets

SHAPED FIBER-REINFORCED CERAMIC COMPOSITE ARTICLE

BACKGROUND OF THE INVENTION

The present invention relates to a method for making a shaped ceramic composite article, and more particularly to a method for making a shaped composite comprising a ceramic matrix and refractory inorganic fiber reinforcement wherein the shaped article is of varying thickness.

As noted in U.S. Pat. No. 4,314,852, hot-pressing has been the most commonly used method for fabricating ceramic matrix composites comprising reinforcing fibers. That method typically comprises first providing a preform or "prepreg" material comprising a long or continuous fiber reinforcement impregnated with a finely divided matrix material in the form of a glass or ceramic powder, forming the impregnated fiber into sheets, and then cutting and stacking the sheets to provide a prepreg stack or preform which can be consolidated into a dense composite by hot pressing. The product of this process is typically a flat or curved planar article of substantially uniform cross-section.

To form more complex configurations from ceramic matrix composite materials, methods other than hot pressing have been proposed. U.S. Pat. No. 4,464,192, for example, describes an injection molding method wherein chopped fibers or whiskers are mixed with glass powders, the mixture is heated to the softening point of the glass, and is then injected into a mold having a desired shape. In U.S. Pat. No. 4,428,763, a transfer molding method for making fiber-reinforced glass composites is disclosed wherein long fibers are aligned in a mold cavity in predetermined orientation and a glass billet is then heated and transferred as molten glass into the mold.

While permitting the fabrication of more complex shapes, injection and transfer molding processes such as these have certain disadvantages. For example, where the fibers employed for reinforcement are chopped fibers or whiskers, they are difficult to align preferentially in directions requiring high strength in the molded product. And, where the loading of chopped fibers is high, the molten fiber/matrix material has high viscosity and is difficult to inject and form into complex shapes.

In the case of transfer molding, it is difficult to insure that the molten glass will completely encapsulate and surround the fibers in the mold cavity. Also, undesirable movement and/or breakage of the pre-aligned fibers in the course of glass transfer into the mold is difficult to avoid.

Attempts to modify hot-pressing procedures to adapt them to the fabrication of complex or precision composite parts have thus far likewise been unsuccessful. A significant problem in this respect resides in the nature of the prepreg materials which are available. As previously noted, these materials are powder-impregnated fibers or fiber tows of very low green density. Sheet stacks of this material constitute particularly unwieldy preforms for precision part forming, since preform densities are typically not more than 25% of the theoretical density of the finished part. This means that substantial debulking of the preform as well as consolidation to full density must be accomplished in a single forming event.

It is not unusual, even in fiber-reinforced polymer systems of much greater proportional starting density, for prepregs to be consolidated in a multi-step process. This is useful for precision part manufacture in order to maintain control over part configuration as the systems are debulked to their final density. For glass and glass-ceramic matrix composites, however, such an approach is not feasible due to factors such as processing expense, fiber degradation on repeated heating to the high forming temperatures required, and surface contamination of the composites from high temperature mold release aids.

It is therefore a principal object of the present invention to provide an improved method for the manufacture of fiber reinforced ceramic matrix composite articles wherein products of arbitrary shape and cross-sectional thickness profile may be made.

It is a further object of the present invention to provide a hot-pressing method for molding ceramic matrix composite parts wherein precision molded shapes comprising interior or exterior edge segments of precise thickness and adequate fiber density may be made.

It is a further object of the invention to provide a method for making ceramic matrix composite articles of improved edge finish.

It is a further object of the invention to provide refractory ceramic matrix composite articles of complex surface configuration and cross-section having improved internal and surface fiber distribution and physical integrity.

Other objects and advantages of the invention will become apparent from the following description thereof.

SUMMARY OF THE INVENTION

The present invention provides a method by which fiber reinforced ceramic matrix composite articles comprising reinforcing fibers disposed in a controlled directions, and of arbitrary shapes and of varying thickness, may be provided. Due to the control which may be obtained over fiber direction, and the fact that extensive redistribution of the fiber reinforcement during consolidation is avoided, strong composite products of precision shape and thickness may be made.

The method of the invention involves the production of a layered ceramic matrix composite article having a preselected thickness profile. In this article, the cross-sectional dimensions of the composite along axes perpendicular to the plane of the layers in the article are governed primarily or at least in part by the number of layers present in the cross-section.

To form the composite, multiple prepreg sheets for the layers are first provided. These sheets comprise inorganic reinforcing fibers impregnated with a particular ceramic (e.g. glass) matrix material, and may be made within a desired size range in accordance with procedures conventional for ceramic matrix composite fabrication.

The prepreg sheets made as described, which are of at least two and most often of several different sizes, are next assembled to provide a multi-layer prepreg stack. This stack is characterized in that, through each cross-sectional dimension of the stack perpendicular to the plane of alignment of the sheets therein, the number of prepreg sheets contributing to the aggregate stack thickness is proportional to the relative thickness selected for that cross-sectional dimension in the layered composite article to be formed. Thus a large number of layers may be present where substantial thickness in the product is required, but only a few or perhaps one layer is provided where the product is to have a thin cross section. By the aggregate stack thickness is meant the aggregate or total thickness of all prepreg sheet layers present in the selected cross-sectional dimension, excluding any empty layers or voids in the stack.

After the prepreg stack has been assembled, it is consolidated by the application of heat and pressure. Consolidation normally comprises heating the stack to at least a temperature sufficient to soften the ceramic matrix material, while applying consolidation pressure to the stack to consolidate it into a dense, substantially void-free consolidated ceramic matrix composite article.

Through the use of a layered prepreg sheet stack as described, we have found that the extent of fiber and matrix redistribution required to reach the final shape for the composite article is minimized. Thus fiber shifting, bowing and/or breakage are substantially avoided, and a strong and homogeneous ceramic part of controlled fiber alignment is obtained.

At the same time, it is found that sufficient fiber redistribution and matrix flow can occur during consolidation to convert the stepped thickness profile of the prepreg sheet stack to a substantially smooth graded thickness profile in the consolidated article. Thus no residual surface traces of internal or external voids or discontinuities due to layer edge terminations or so-called ply drops in the prepreg sheet stack can be seen.

The prepreg sheet stack utilized in the invention will normally comprise at least three and usually several prepreg sheets, including opposing top and bottom prepreg sheets which form the exterior facing layers of the prepreg stack. At least one and preferably both of the top and bottom sheets are sufficiently large (i.e., extend outwardly from the stack to a sufficient distance) that they will fully cover interior sheets of the stack.

The purpose of extending the top and/or bottom facing sheets is to provide at least one and preferably two surfacing layers on the consolidated article which are substantially free of discontinuities, both in the level of fiber loading and in the prevailing direction or directions of fiber alignment on the part surface. Where both facing sheets are extended beyond the interior sheets along a portion or all of the peripheral edge of the stack, they may be edge-joined at least along a portion of the extending edges to form an envelope which wholly or partly encases the interior or core prepreg sheet layers. This provides a product with facing surfaces of high strength which are particularly resistant to fluid erosion at high temperatures and flow velocities.

In the process of consolidating the sheet stack, consolidation pressure is generally applied to the stack by forming die means which include opposing molds having surface contours corresponding to the surface contour selected for the final composite product. These are typically matched mold tools, such as opposing cavity molds or the like.

In a further aspect, to provide very high edge quality in formed composite parts as hereinafter more fully described, the forming molds or other tooling means most preferably comprise one or more edge gap or so-called "flow choke" regions, extending outwardly from the contoured surfaces of the molds. The contoured surfaces define the surface configuration and edge outline for the part, while the edge gaps will contain only excess or flash material from the prepreg. Utilizing such edge gap means in combination with an appropriately designed prepreg sheet stack comprising excess prepreg flow choke material for filling the flow choke region, most preferably prior to consolidation, can yield precision composite parts exhibiting substantially improved edge quality and finish.

The product of the process above described is a multi-layer ceramic matrix composite article with one or more smoothly curved exterior surfaces, which article is characterized by a varying cross-sectional thickness along axes perpendicular to at least one its curved surfaces. The varying thickness is produced at least in part by a variation in the number of layers of composite material present in the article cross-section traversed by the axes.

The preferred composite article is further characterized in that at least one of the curved surfaces is formed of a layer of composite material comprising a ceramic matrix reinforced with long, substantially unbroken or continuous inorganic fibers, in contradistinction to chopped fibers or whiskers, the fibers being disposed in directions parallel to the curved surface. This layer is advantageously smooth, continuous, and relatively homogeneous with respect to the proportion and distribution of reinforcing fibers therein.

DESCRIPTION OF THE DRAWINGS

The invention may be further understood by reference to the drawing wherein:

FIG. 6 illustrates a design for a modified preform stack for the fabrication of an airfoil blade in accordance with the invention;

FIG. 8 is a schematic cross-sectional elevational view of modified consolidation mold apparatus useful for composite fabrication in accordance with the invention.

DETAILED DESCRIPTION

Figure 1:
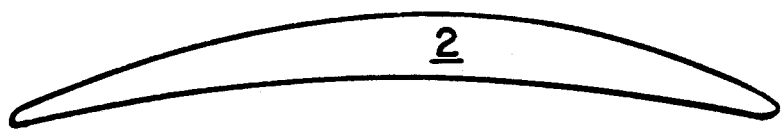
FIG. 1 is a schematic elevational end view of the cross-sectional profile of a composite article of thin airfoil configuration provided in accordance with the invention.

As will readily be appreciated, the invention is not limited in its application to any particular composition or type of fiber-reinforced ceramic matrix composite material. Thus, for example, while the inorganic fibers presently preferred for use as reinforcement materials for ceramic matrix composites are silicon carbide fibers (also referred to as silicon oxycarbide fibers in the art), other types of fibers may alternatively be used. Examples of such fibers include fibers of carbon, alumina, $B_4C$, BN, zircon, mullite, spinel or silicon nitride.

Similarly, the selection of a ceramic matrix material to be utilized for composite fabrication in accordance with the invention is not limited to any specific type of glass or ceramic material. For applications requiring best high temperature performance, we prefer to employ refractory alkaline earth aluminosilicate glass-ceramics as the matrix material. Such glass-ceramics are disclosed, for example, in U.S. Pat. No. 4,615,987, and include glass-ceramics wherein the predominant crystal phase is selected from the group of anorthite ($CaO.Al_2O_3.2SiO_2$) and its pseudo-binaries with mullite ($3Al_2O_3.SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.6SiO_2$), $Al_2O_3$, $SiO_2$, $CaO.SiO_2$, and gehlenite ($2CaO.Al_2O_3.SiO_2$).

Other refractory alkaline earth aluminosilicate glass-ceramics include those comprising a predominant crystal phase consisting essentially of triclinic anorthite in combination with at least one of mullite and alpha alumina, these glass-ceramics being disclosed in U.S. Pat. No. 4,755,489. Further, U.S. Pat. No. 4,464,475 discloses alkaline earth aluminosilicate glass-ceramics wherein the principal crystal phase is selected from the group consisting of barium osumilite, cordierite, and stuffed cordierite, the ions comprising the stuffing ions in the stuffed cordierite compositions being selected from the group consisting of Ba, Ca, Sr and Cs. Barium-stuffed cordierite glass-ceramics, in particular, exhibit relatively low coefficients of thermal expansion and high elastic moduli.

For somewhat less demanding applications, matrix materials comprising lithium or zinc aluminosilicate glass-ceramics may be selected. U.S. Pat. No. 4,554,197 describes the use of glass-ceramic matrix materials of this type, which may also contain magnesium but which are typically essentially free of $TiO_2$. These glass-ceramics are characterized by the presence of a principal crystal phase selected from the group consisting of beta-quartz solid solution (sometimes referred to as beta eucryptite solid solution) and beta spodumene solid solution.

Finally, the method of the invention is well suited for the manufacture of composites wherein glass matrix materials are employed. The preferred glasses for this use are alkali-free alkaline earth aluminosilicate glasses, such glasses being substantially free of alkali metal oxides such as $Na_2O$, $Li_2O$, and $K_2O$, and including one or more alkaline earth metal oxides selected from the group consisting of CaO, MgO, SrO and BaO.

For the practice of the invention the selected reinforcing fibers will be combined with the selected ceramic matrix material in fine particulate or powdered form. Such particulate matrix materials may readily be produced from glasses by drigaging, grinding and/or milling.

The fine matrix powders thus provided are most conveniently combined with the fibers to provide so-called prepreg fibers or sheets by impregnating the fibers with liquid suspensions of the powders in suitable vehicles. Typically, flowable suspensions of the powders, which may comprise dispersants and binder constituents in addition to the vehicle and glass powder, are applied to the fibers by spraying or immersion of fibers into the suspensions.

Fiber mats or tows impregnated with powdered glass as described can be formed into prepreg sheets suited for assembly into sheet stacks by pressing or winding the impregnated fiber material onto drums or other supports to provide green sheet prepreg which may be dried and cut to any suitable shape. The thickness of the sheets may of course be varied over relatively broad ranges, although it is normally preferred, from the standpoint of production cost and convenience, that the sheets utilized for a particular product configuration and its precursor sheet stack design be of approximately the same thickness.

The method of the invention is particularly well adapted for the fabrication of layered ceramic matrix composite parts wherein the edge thickness of the part is small and the center thickness is greater than the edge thickness. Examples of parts of this configuration include airfoil shapes such as turbine blades or airflow deflectors. A typical shape for such a part, not to scale, is schematically illustrated in FIG. 1 of the drawing, which is a cross-sectional end view of a turbine stator blade 2 showing the thin edge configuration and somewhat thicker center thickness which are desired.

Figure 2:
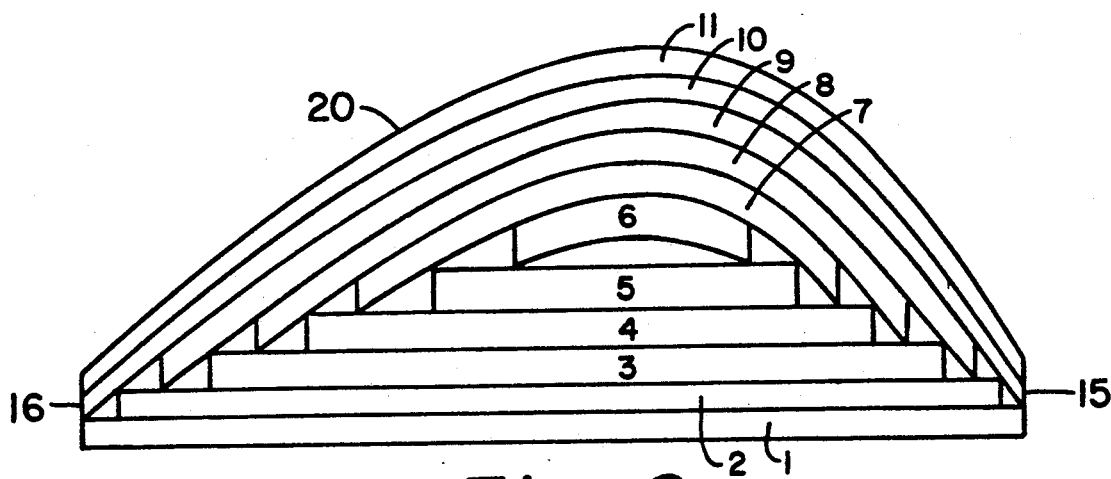
FIG. 2 is a schematic elevational view in cross section of a preform stack for the fabrication of a blade of airfoil shape in accordance with the invention.

As previously indicated, in designing parts of this type it is preferred to position smaller prepreg sheets interiorly of the sheet stack, and to have both the top and bottom prepreg sheets extend at least to the edges of the stack. FIG. 2 is a schematic illustration of a sheet stack 10 having a preferred design for the fabrication of a product having the cross-sectional configuration shown in FIG. 1. As shown in FIG. 2, both bottom and top prepreg sheets of stack 20, shown as sheets 1 and 11, respectively, extend at least to top subsheet 10 and beyond all of the interior or core sheets 2–9. Thus in the course of consolidation, prepreg sheets 1, 10 and 11 will fuse along leading edge 15 and trailing edge 16 of the stack to provide a sealed outer envelope or skin of smooth and homogeneous composite material for the final composite product.

Although the use of extended surface layers is illustrated herein primarily with respect to ceramic matrix composites of thin edge design, the use of such surfacing is of course not limited thereto. Layered composite parts having relatively thick (multi-layer) edge portions adjoining interior portions of thin cross-section will also show improved surface characteristics with exterior positioning of the largest prepreg sheets and interior positioning of smaller layer segments.

Prepreg sheet stacks produced as herein described may be consolidated under conditions of heat and pressure conventional for composite preforms of multi-layer type. Normally, the layered assembly will first be subjected to a burnout treatment wherein it is heated, before or after preliminary shaping by molding or the like, to a temperature at least sufficient to remove any volatile or oxidizable binder or other organic components from the prepregs. Thereafter, a hot pressing process is carried out during which the temperature of the assembly is raised at least above the sintering temperature of the powdered matrix material and pressure is applied to eliminate voids in the material.

In the case of glass-ceramic matrix materials, crystallization of the matrix material to effect conversion to a glass-ceramic matrix is usually achieved concurrently with consolidation in the course of the hot pressing process. This simply requires a crystallization interval in the process during which the temperature of the material under consolidation is maintained at a level sufficient to promote rapid conversion to a highly crystalline material.

The invention may be further understood by reference to the following detailed examples, which are intended to be illustrative rather than limiting.

EXAMPLE 1

To fabricate a ceramic matrix composite article in the form of a small airfoil blade having a thin edge configuration, prepreg sheets for a silicon carbide fiber reinforced glass-ceramic matrix composite material suitable for blade construction are first prepared in accordance with conventional practice. A powdered glass matrix material which is convertible by thermal crystallization to a dense refractory glass-ceramic matrix material is first prepared for incorporation into the composite. This glass has a composition, in weight percent, of about 39.5% $SiO_2$, 38.5% $Al_2O_3$, 18.4% CaO, 0.5% $As_2O_3$, and 3.0% $ZrO_2$, and can be converted to a crystalline anorthite glass-ceramic material by appropriate heat treatment.

A glass of this composition is first melted in a platinum crucible, with the resulting melt being converted to a glass frit by drigaging. The glass frit is then milled to provide a glass powder with an average particle size of about 10 microns, and is incorporated into a slurry suitable for impregnating a fiber tow material. The slurry is a smooth, flowable aqueous suspension of the powdered glass containing a conventional dispersant and binder.

The reinforcing fiber selected for incorporation in the layered composite is a silicon oxycarbide fiber tow material which is commercially available as Nicalon ® NLM-202 silicon carbide yarn from the Nippon Carbon Co. of Tokyo, Japan. A continuous strand of this yarn is coated and impregnated with the slurry of glass powder by passing the yarn through the slurry. Prior to immersion in the slurry, the yarn is passed through a flame to remove sizing and other combustible impurities from the surfaces of the fiber.

The coated yarn thus produced is drawn through a stripping die to remove excess slurry from the fibers and is then wound around a rotating drum to form a continuous layer or sheet prepreg having unidirectional fiber orientation thereon. This sheet is then cut from the drum and dried flat to provide flat green prepreg mats approximately 0.050 inch in thickness wherein silicon carbide fibers are unidirectionally oriented in the mat.

To provide a layered preform stack for the production of a blade shape from this prepreg, eleven rectangular sheets are cut therefrom. The sheets have a length of 4 inches, and range in width from about 1.5 inches for the widest sheets to approximately 0.3 inch for the narrowest sheets.

The sheets are then arranged substantially as shown in FIG. 2 of the drawing into a stack of prepreg layers. The stack is formed of a bottom cut prepreg sheet 1 and top cut prepreg sheet 11 between which are positioned interior or core sheets 2–10 of varying width providing a preform of varying aggregate sheet thickness. To improve the multi-directional strength of the blade product, some of the sheets are cut at directions transverse to the direction of fiber alignment in the prepreg, and stacked to provide a variation in the angle of reinforcing fiber direction, with respect to the long axis of the blade (0°). Table I below records the direction of fiber alignment for each of the cut prepreg sheets in the stack:

TABLE I

| Layer | Layer Fiber Alignment | | | | | | | | | | |
|---|---|---|---|---|---|---|---|---|---|---|---|
| | 1 | 2 | 3 | 4 | 5 | 6 | 7 | 8 | 9 | 10 | 11 |
| Position | (bottom) | | | | | | | | | | (top) |
| Fiber Align.(°) | 0 | 90 | 45 | −45 | 0 | 0 | −45 | 45 | 0 | 90 | 0 |

Figure 3:
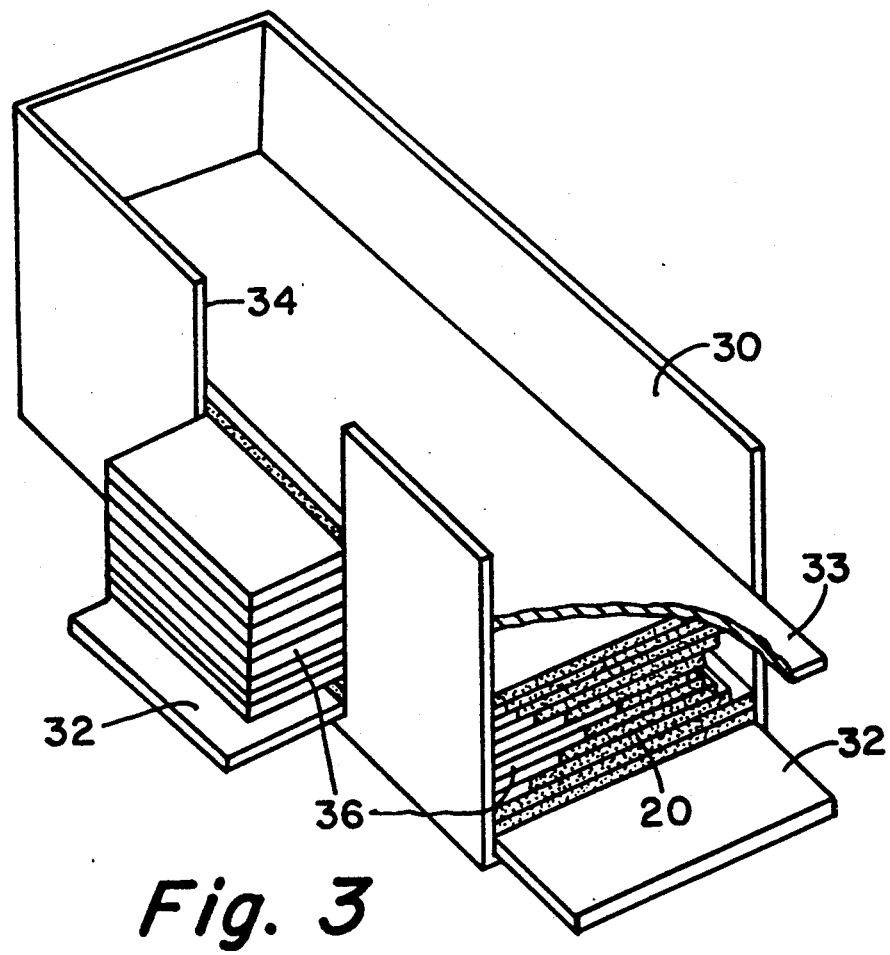
FIG. 3 is a schematic view of layup apparatus useful for composite fabrication in accordance with the invention.

A convenient method for providing a preform stack wherein prepreg sheets of varying sheet size are appropriately positioned to provide a preselected thickness profile in the finished product utilizes layup apparatus such as schematically illustrated in FIG. 3 of the drawing. As shown in FIG. 3, the layup procedure is carried out in a rectangular 3-sided metal can 30 comprising a removable metal bottom plate 32 and top plate 33. Each of the layers in sheet stack 20 is positioned at a preselected distance from side 34 of the can by interleaved temporary spacers 36. Each of spacers 36, which are preferably composed of an inert polymer such as PTFE, is of a preselected width appropriate to position the corresponding prepreg sheet at a preselected distance from side 34 and thus a preselected edge offset position within the stack, and each spacer has a thickness equal to the thickness of the corresponding sheet.

Due to various microstructural and processing factors, the thickness through a given cross-section of a consolidated article produced from a prepreg stack such as described is not directly proportional to the aggregate sheet thickness through the initial stack. For these particular prepregs, however, the final thickness T in mils may be approximated by the empirical formula $T = 0.282L^2 7.57L$, wherein L is the number of prepreg layers of 0.050 inch thickness provided in the cross-section of interest. This formula can be used to determine the stacking design for a composite article of arbitrary thickness profile formed of the prepregs of this example, or simple trials may instead be employed to optimize the stack design best suited for the generation of a specific part thickness profile.

After layup of the preform stack has been completed, the stack is lifted from the layup can and the spacers are removed from the stack. The stack is then returned to the can and processed through a burnout cycle comprising heating the stack in air to approximately 450° C. to remove organic materials from the prepreg layers.

Figure 4:
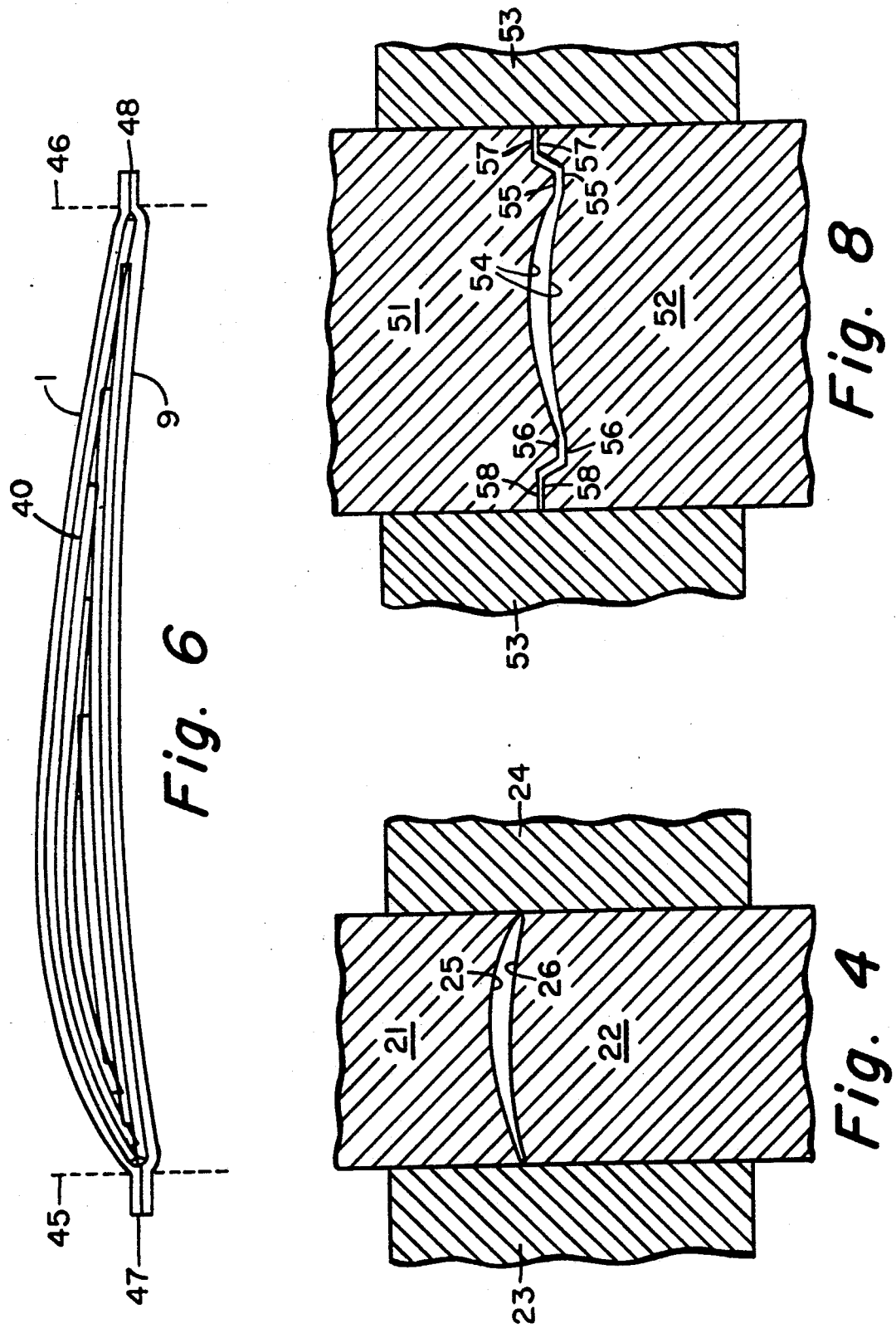
FIG. 4 is a schematic cross-sectional elevational view of consolidation mold apparatus useful for composite fabrication in accordance with the invention.

The resulting stack, free of organic material, is next positioned in a cavity mold for high temperature consolidation under pressure into a dense composite article. The mold comprises upper and lower graphite plungers each having a machined face appropriate in shape for forming, respectively, the upper and lower surfaces of a small airfoil blade having the cross-section illustrated in FIG. 1 of the drawing. FIG. 4 of the drawing provides a schematic cross-sectional view, not in true proportion or to scale, of a mold assembly of suitable design comprising top and bottom plungers 21 and 22 positioned slidably between retaining graphite sleeve members 23 and 24 and having machined faces 25 and 26 for achieving the desired surface figure in the preform stack during the consolidation process.

Consolidation of the stack is achieved by inserting the plungers and side retainers with the prepreg stack in a cylindrical graphite sleeve and placing the assembly in a hot pressing furnace wherein it is heated to a temperature of 1340° C. over a heating interval of approximately 3 hours. As the peak hot pressing temperature is approached, the pressure on the preform stack is increased to a level of about 1500 psi, and is maintained for about 10 minutes at the peak temperature. Thereafter, the pressure and temperature are gradually reduced over a two-hour period until ambient conditions are reached.

The consolidated product produced as described has a cross-sectional profile as shown in FIG. 1 of the drawing. The article has a smoothly varying surface profile and curvature, the flow of matrix material and fiber during the course of the consolidation being sufficient to substantially remove any evidence of ply drops from the surface of the final article.

Figure 5:
FIG. 5 is a photomicrograph taken at 25× magnification of a portion of a cross section of an airfoil blade provided from a stacked preform in accordance with the invention.

FIG. 5 of the drawing is an optical photomicrograph of a portion of a cross-section of the blade provided taken at a magnification of 25×. The uniform distribution of fibers and matrix within the bulk of the material and the relative smoothness and homogeneity of the surface layers on the composite part are clearly shown.

While composite products such as provided in accordance with the above Example exhibit excellent strength and toughness and adequate surface and edge finish for many high temperature uses, further improvements in product homogeneity, particularly with respect to the edge finish of blade edges of composites such as shown, are needed for demanding applications. In the case of the blade section shown in FIG. 5, for example, some maldistribution of the fibers and/or matrix within the trailing edge of the blade cross-section at the left edge of the micrograph can be seen.

This particular edge effect is common of composite parts made by the molding procedure of the foregoing Example, and is presently explained as follows. Mold materials suitable for the hot pressing of these very refractory composite materials are not presently machinable to tolerances sufficient to totally inhibit flashing of the composite material into the plunger/sidewall interface during the consolidation process.

Flashing is aggravated by the large mold traverse distances required to achieve the extensive prepreg debulking associated with the consolidation of these prepreg materials. The extended interval of sidewall drag experienced by the edges of the prepreg stack during stack compaction tends to draw significant amounts of matrix material and/or fibers from the edges of the stack into the plunger/sidewall interface. The material thus withdrawn is not readily replaced by matrix flow or fiber movement from the interior of the preform, with the result that fiber- or matrix-depleted materials frequently predominate at the leading and trailing edges of the consolidated product.

In a further important aspect, then, the invention provides a molding process improvement through which edge quality in consolidated composite preforms produced by pressure consolidation as above described may be substantially improved. In accordance with that process, a prepreg stack for a composite part having a selected part edge outline comprises at least one and preferably two or more prepreg layers which extend beyond the selected edge outline for the part. The extended layers, which may be surface layers or interior layers, provide excess material, referred to as flow choke material, which protects the part edge during consolidation.

FIG. 6 of the drawing illustrates a stacking design 40 for a prepreg stack suitable for fabricating a small airfoil blade similar in edge outline and thickness profile to the blade shown in FIG. 1. The design shows interference between layers in the stack; this corresponds to material which will be available to fill interlayer voids at ply drops in the course of consolidation of the prepreg sheet stack.

In contrast to the stack design shown in FIG. 2, the top and bottom sheets 1 and 9 in the design of FIG. 6 are shown extending beyond the part edge outline indicated by broken lines 45 and 46 in the drawing. These extensions form adjunct flow choke segments 47 and 48 which will function to inhibit the outflow of fiber and or matrix materials from part edge regions adjacent 45 and 46 during subsequent consolidation of the stack.

Figure 7:
FIG. 7 is a photomicrograph at a magnification of 50× of a cross section of an edge segment of a second airfoil composite article provided in accordance with the invention.

FIG. 7 of the drawing is an optical photomicrograph of a cross-section of a leading edge section of a small composite air foil blade made from a preform stack such as shown in FIG. 6. The effectiveness of the flow choke segment A in preserving the homogeneity of the composite material at edge region B of the blade is evident from this micrograph. Removal of the adjunct flow choke material, which can easily be accomplished by machining or other conventional method, assures a final part of excellent edge quality and surface homogeneity.

Consolidation of a preform stack such as shown in FIG. 6 to provide a part such as shown in FIG. 7 can be conveniently accomplished utilizing opposing mold plungers wherein an edge gap region, extending beyond the surface contoured mold surfaces defining the surfaces and selected edge outline for the part, is provided. This edge gap or flow choke region provides limited clearance for the flow choke material, permitting that material to function as an inhibitor of the outflow of prepreg material from the stack during consolidation. Thus zones within the stack corresponding to the edges of the composite part are insulated from the undesirable effects of excessive flashing of prepreg material into the plunger/sleeve interface during prepreg compaction and consolidation.

FIG. 8 of the drawing is a schematic cross-sectional elevational view of a mold assembly comprising opposing mold plungers incorporating an edge gap as described. As shown in FIG. 8, opposing top and bottom plungers 51 and 52, respectively, positioned between sleeve segments 53, comprise contoured mold surfaces 54 adapted to form opposing top and bottom surfaces of an airfoil blade. Extending outwardly from surfaces 54 are opposing planar surface extensions 55 and 56 forming, respectively, leading and trailing edge gap regions connecting with the leading and trailing zones of the cavity formed by contoured surfaces 54. Opposing shoulder sections 57 and 58 on the mold plungers act as stops limiting closure of the plungers within sleeve 53, thus controlling the size of the mold cavity and edge gap, and thereby the degree of flow choke effectiveness exhibited by the gap.

A particular advantage of the use of molding equipment provided with edge gap means as above described is that loose tolerances, particularly at the sleeve/plunger interface within the molding assembly, can be tolerated without harmful effects on the edge quality of the composite parts. Thus the edge gap and flow choke material control the amount of flashing occurring during part consolidation without regard for the clearance provided between the mold plungers and sidewall elements of the molding assembly. Accordingly, a method for the precision fabrication of ceramic matrix composite products of thin blade or other designs which are fully homogeneous and consolidated throughout is provided.

While the invention has been particularly described above with respect to specific materials, apparatus and procedures, it will be recognized that such embodiments are presented for purposes of illustration only and are not intended to be limiting. Thus numerous modifications and variations upon the compositions, processes and apparatus specifically described herein may be resorted to by those skilled in the art within the scope of the appended claims.

We claim:

1. A multi-layer ceramic matrix composite article having at least one curved exterior surface and a varying thickness along axes perpendicular to the surface, wherein the varying thickness is produced at least in part by a variation in the number of layers of composite material traversed by the axes, and wherein the curved surface is formed of a facing layer of composite material comprising a ceramic matrix reinforced with long, substantially unbroken inorganic fibers disposed in directions parallel to the curved surface, said facing layer (i) being sufficiently large to cover the layers of composite material therebeneath and (ii) comprising edge portions which are substantially free of fiber- or matrix-depleted composite material.

2. An article in accordance with claim 1 wherein the inorganic fibers are selected from the group consisting of carbon, silicon carbide, and silicon oxycarbide fibers.

3. An article in accordance with claim 2 wherein the ceramic matrix is composed of a glass or glass-ceramic.

* * * * *